(12) United States Patent
Mick et al.

(10) Patent No.: US 6,609,380 B2
(45) Date of Patent: Aug. 26, 2003

(54) LIQUID FUEL NOZZLE APPARATUS WITH PASSIVE PROTECTIVE PURGE

(75) Inventors: Warren James Mick, Altamont, NY (US); Urmila Chennuru Reddy, Irving, TX (US); Robert Joseph Iasillo, Glenville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,937

(22) Filed: Dec. 28, 2001

(65) Prior Publication Data
US 2003/0121269 A1 Jul. 3, 2003

(51) Int. Cl.$^7$ ................................................ F02C 1/00
(52) U.S. Cl. ......................................... 60/776; 60/742
(58) Field of Search ....................... 60/39.094, 39.463, 60/737, 742, 746, 747, 776

(56) References Cited
U.S. PATENT DOCUMENTS

| | | | | |
|---|---|---|---|---|
| 4,041,695 A | | 8/1977 | Harper et al. | |
| 4,327,547 A | * | 5/1982 | Hughes et al. | 60/39.463 |
| 4,337,618 A | * | 7/1982 | Hughes et al. | 60/742 |
| 4,344,280 A | * | 8/1982 | Minakawa et al. | 60/747 |
| 4,425,755 A | * | 1/1984 | Hughes | 60/742 |
| 5,247,797 A | * | 9/1993 | Fric et al. | 60/737 |
| 5,615,555 A | * | 4/1997 | Mina | 60/742 |
| 5,784,875 A | | 7/1998 | Statler | |
| 6,145,294 A | | 11/2000 | Traver et al. | |

* cited by examiner

Primary Examiner—Michael Koczo
(74) Attorney, Agent, or Firm—Nixon & Vanderhye

(57) ABSTRACT

In a gas turbine having a compressor, a combustor and a turbine, a gaseous fuel supply coupled to provide gaseous fuel to the combustor, a liquid fuel supply coupled to provide liquid fuel to the combustor via nozzle assembly. The nozzle assembly includes a plurality of passageways for flowing a fluid into the combustor, one of the passageways being a fuel passageway conduit interconnect the fuel passageway to one of the plurality of passageways to enable fluid flow therebetween. High pressure air from one of the plurality of passageways is diverted into the fuel passageway via the conduit to protect nozzle from ingestion of hot combustor gases.

8 Claims, 3 Drawing Sheets

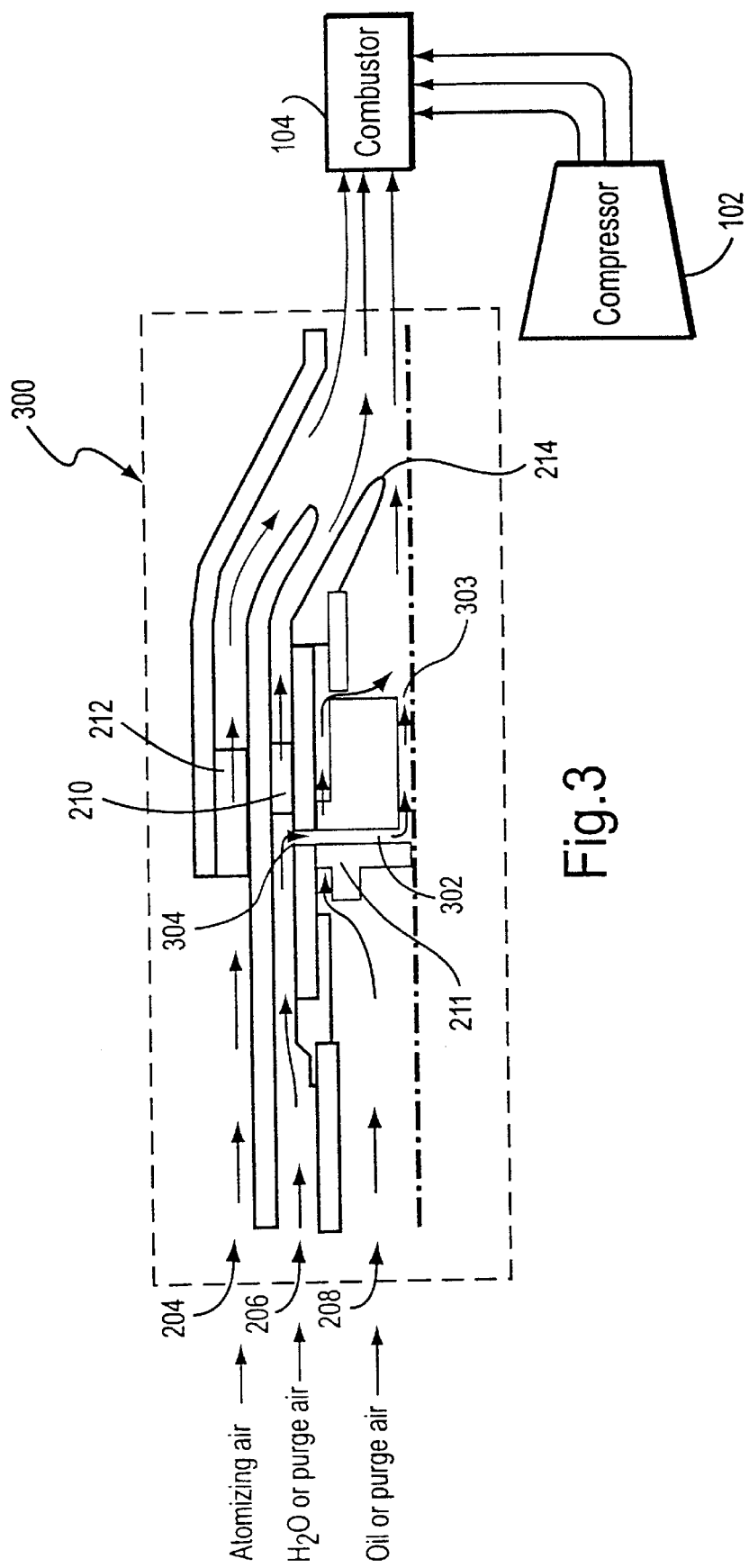

LIQUID FUEL NOZZLE APPARATUS WITH PASSIVE PROTECTIVE PURGE

BACKGROUND OF THE INVENTION

This invention relates to gas turbines, and more particularly, to a liquid fuel nozzle having a passive protective purge for protecting the nozzle from damage when neither liquid fuel nor active purge is flowing through the nozzle.

Industrial gas turbines often are capable of alternatively running on liquid and gaseous fuels. These gas turbines have fuel supply systems for both liquid and gas fuels, e.g., natural gas. The gas turbines generally do not simultaneously burn both gas and liquid fuels. Rather, when the gas turbine burns liquid fuel, the gas fuel supply is turned off and vice-versa. The fuel system that is not being used is usually purged with air.

Gas turbines that burn liquid fuels require a liquid fuel purge system to clear combustor fuel nozzles of liquid fuel. Air is typically used to actively purge unused combustor nozzle passages during turbine operation. Purge air supplied from an external source is regulated by a control valve. When the fuel system is activated or deactivated during turbine operation, the purge air needs to be turned on or off. The purge air and fuel are generally not permitted to be "on" at the same time for safety reasons. Thus, when activating a fuel system, the purge air is shut "off" before the fuel is turned on, and when deactivating a fuel system, the fuel is shut "off" before the purge air is turned "on". This sequence results in a brief period during which there is neither fuel flow nor purge air, thus opening the possibility of ingesting combustion gases into the fuel nozzle. The brief no-flow period may also cause thermal distress of the fuel nozzle.

In one existing approach, the time-period during which both the fuel and-purge air are "off" is minimized for preventing fuel nozzle damage during a brief no-flow period. There are practical limits, however, as to how short this time-period can be set. Also, flowing purge air quickly to a fuel system that is full of fuel due to a prior operation may force the left over fuel into the combustor and produce an undesirable surge in turbine output. Further, the turbine control system requires some minimum time to confirm that a fuel valve or a purge air valve is in fact closed before opening the control valve to the other.

In another existing approach, a portion of combustor inlet air is diverted to wash over an outer exit of a fuel nozzle passage so that any back-flow into the nozzle will be just air and not hot combustion products. This approach, however, is not only difficult to implement but also includes performance side effects.

Therefore, there is a need for a system and method to overcome the above-identified drawbacks.

BRIEF SUMMARY OF THE INVENTION

Accordingly, a solution to overcome the problems identified in the prior approaches is proposed. Specifically, a liquid fuel nozzle having a passive protective purge in order to protect the nozzle from damage during periods when neither liquid fuel nor active purge is flowing through the nozzle is shown.

In accordance with one embodiment of the present invention, there is provided an apparatus and method for purging a liquid fuel nozzle and protecting the same from back-flowing combustion gases during a transition period when neither liquid fuel nor active purge are flowing through the nozzle. Specifically, the apparatus includes a liquid fuel nozzle having a first passageway for carrying fuel ("fuel passageway"), a second passageway disposed adjacent to the fuel passageway for carrying purge air. The second passageway is further capable of carrying water into a combustor. A third passageway is provided for carrying atomizing air into the combustor. A crossover passage or a conduit interconnects the fuel passageway to the second passageway in order to divert high-pressure air from the second passageway into the fuel passageway, thus preventing ingestion of backflowing combustion gases.

During a period when operation of the gas turbine is shifted from gas fuel to liquid fuel or viceversa, when both the liquid fuel and liquid fuel purge air are shut off from flowing into the combustor via the fuel passageway, purge air flowing through the second passageway continues to flow. A portion of the purge air is diverted into the fuel passageway via the crossover conduit to prevent ingestion of combustion gases into the nozzle, thus protecting fuel nozzle tips from deteriorating.

In another embodiment, the liquid fuel nozzle includes a plurality of passageways, one of the passageways being a fuel passageway. A crossover conduit interconnects the fuel passageway to a select one of the plurality of passageways to enable fluid flow therebetween. High-pressure air from the select passageway is diverted into the fuel passageway via the conduit to purge the liquid fuel nozzle.

In its broader aspects a gas turbine having a compressor, a combustor and a turbine, a gaseous fuel supply coupled to provide gaseous fuel to the combustor, and a liquid fuel supply coupled to provide liquid fuel to the combustor via a nozzle assembly is provided. The nozzle assembly includes a plurality of passageways for flowing a fluid into the combustor, one of the passageways being a fuel passageway, a conduit interconnecting the fuel passageway to one of the plurality of passageways to enable fluid flow therebetween. One of the plurality of passageways flows high pressure air. High pressure air from one of the plurality of passageways is diverted into the fuel passageway via the conduit to protect the nozzle from ingestion of hot combustor gases. The plurality of passageways flow air when the gas turbine is operating on gas fuel. One of the passageways is an atomizing air passageway which flows air at a higher flow rate when the gas turbine is operating on liquid fuel. The first end of the conduit is coupled to the fuel passageway and an opposite second end is coupled to one of the plurality of passageways. The first end of the conduit is preferably coupled to the fuel passageway at a location downstream of a first swirler arranged in the fuel passageway. The second end of the conduit is preferably coupled to one of the plurality of passageways at a location upstream of a second swirler arranged in the one of the plurality of passageways.

In another aspect, a liquid fuel nozzle assembly for supplying liquid fuel to a combustor of a gas turbine, the nozzle assembly comprising a fuel passageway for flowing liquid fuel into the combustor, a second passageway disposed adjacent to the fuel passageway for flowing purge air into the combustor, the fuel and second passageways interconnected via a conduit to enable fluid flow therebetween to protect the nozzle from ingestion of hot combustor gases. The nozzle assembly further comprises an atomizing air passageway for flowing atomizing air into the combustor, the atomizing air passageway flows air at a higher flow rate when the gas turbine is operating on liquid fuel.

In yet another aspect, a dual fuel gas turbine having a compressor, a combustor and a turbine, a method of purging a liquid fuel nozzle comprising the steps of flowing fluids into the combustor via a plurality of passageways of the nozzle, one of the passageways being a fuel passageway. The fuel passageway is coupled to one of the plurality of passageways via a conduit. One of the plurality of passageways flows high pressure air. High pressure air from one of the plurality of passageways is diverted into the fuel passageway to protect the liquid fuel nozzle from ingestion of hot combustor gases.

In a further aspect, a method of protecting a liquid fuel nozzle used in a dual-fuel gas turbine having a compressor, a combustor, and a turbine, the method comprising flowing liquid fuel via a fuel passageway into the combustor, flowing purge air into the combustor via a second passageway disposed adjacent to the fuel passageway and interconnecting the fuel and second passageways via a conduit to enable fluid flow therebetween to protect the nozzle from ingestion of hot combustor gases.

In another aspect, a method for purging a dual fuel gas turbine having a combustor, a compressor and a turbine, the method comprising the steps of supplying liquid fuel to the combustor via a nozzle having a plurality of passageways, one of the passageways being a fuel passageway, interconnecting the fuel passageway to one of the plurality of passageways via a conduit to enable fluid flow therebetween, and protecting the nozzle from ingesting backflow combustion gases by diverting high pressure air from one of the plurality of passageways into the fuel passageway via the conduit.

In yet another aspect, a gas turbine having a combustor, a compressor and a turbine, a nozzle for supplying liquid fuel to the combustor, a method of passively purging liquid fuel from the nozzle comprising flowing liquid fuel into the combustor via a fuel passageway, flowing high pressure air into the combustor via a second passageway disposed adjacent to the fuel passageway. The fuel and second passageways are interconnected via a conduit to enable flow of high pressure air from the second passageway into the fuel passageway to prevent ingestion of backflow combustion gases into the nozzle.

In another aspect provides a dual-fuel gas turbine having a compressor, a combustor, and a turbine, a method of protecting a liquid fuel nozzle from ingestion of backflow combustion gases. The method includes flowing liquid fuel into the combustor via a fuel passageway, flowing high pressure air into the combustor via a second passageway, and interconnecting the fuel and second passageways via a conduit to direct flow of high pressure air, from the second passageway to the fuel passageway, into the combustor.

BRIEF DESCRIPTION OF THE DRAWINGS

FIG. 3 shows a cross-sectional view of a liquid fuel nozzle cartridge having three passageways in accordance with an exemplary embodiment of the present invention.

DETAILED DESCRIPTION OF THE INVENTION

Figure 1:
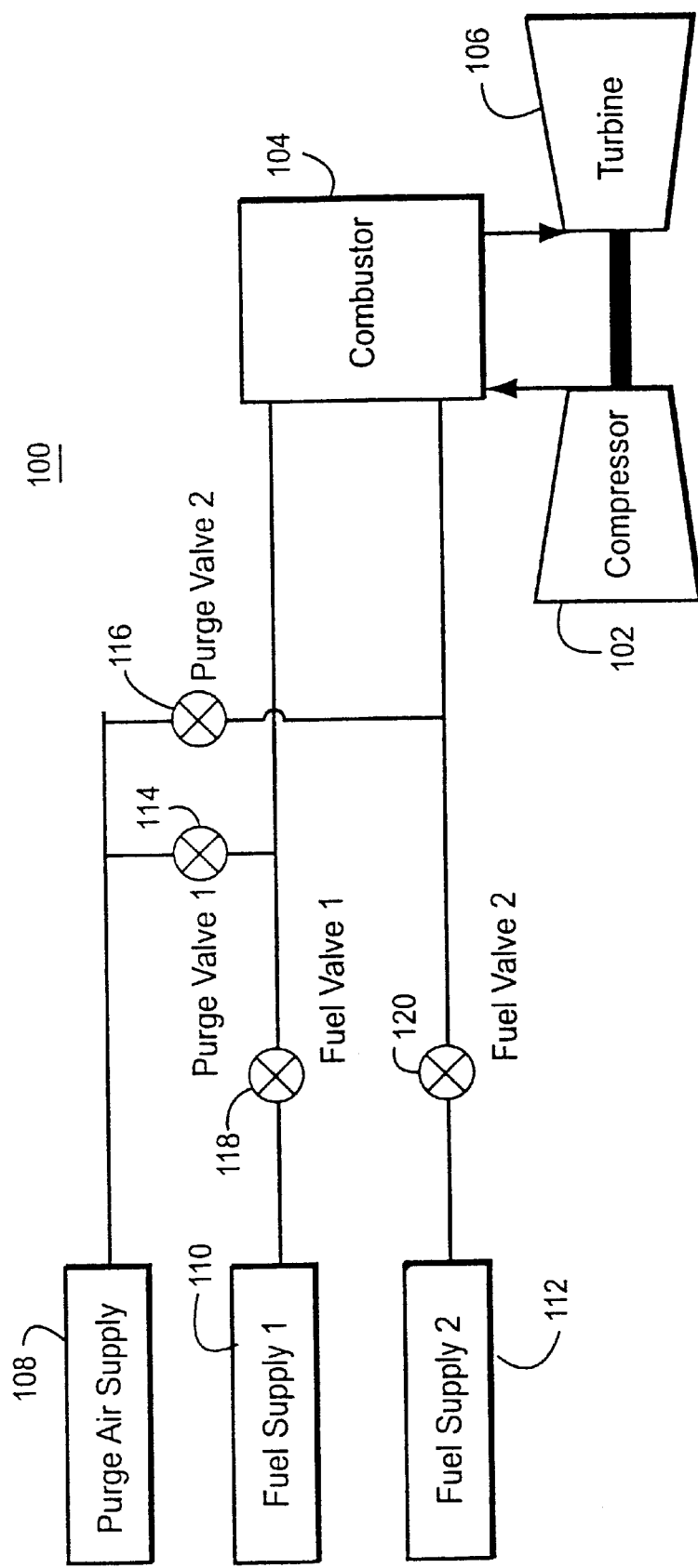
FIG. 1 shows a schematic of an exemplary dual fuel gas turbine engine system with purge mechanism.

Fig.1 shows schematically a gas turbine 100 having a compressor 102, a combustor 104, and a turbine 106. The gas turbine 100 further includes a purge air supply system 108, a first fuel supply system 110, and a second fuel supply system 112. Fuel valves 118, 120 regulate supply of fuel from first and second fuel supply systems 110, 112, respectively. Similarly, purge valves 114, 116 regulate the supply of purge air from the purge air supply system 108 to supply lines carrying fuel from fuel supply systems 110, 112, respectively, into the combustor 104.

Figure 2:
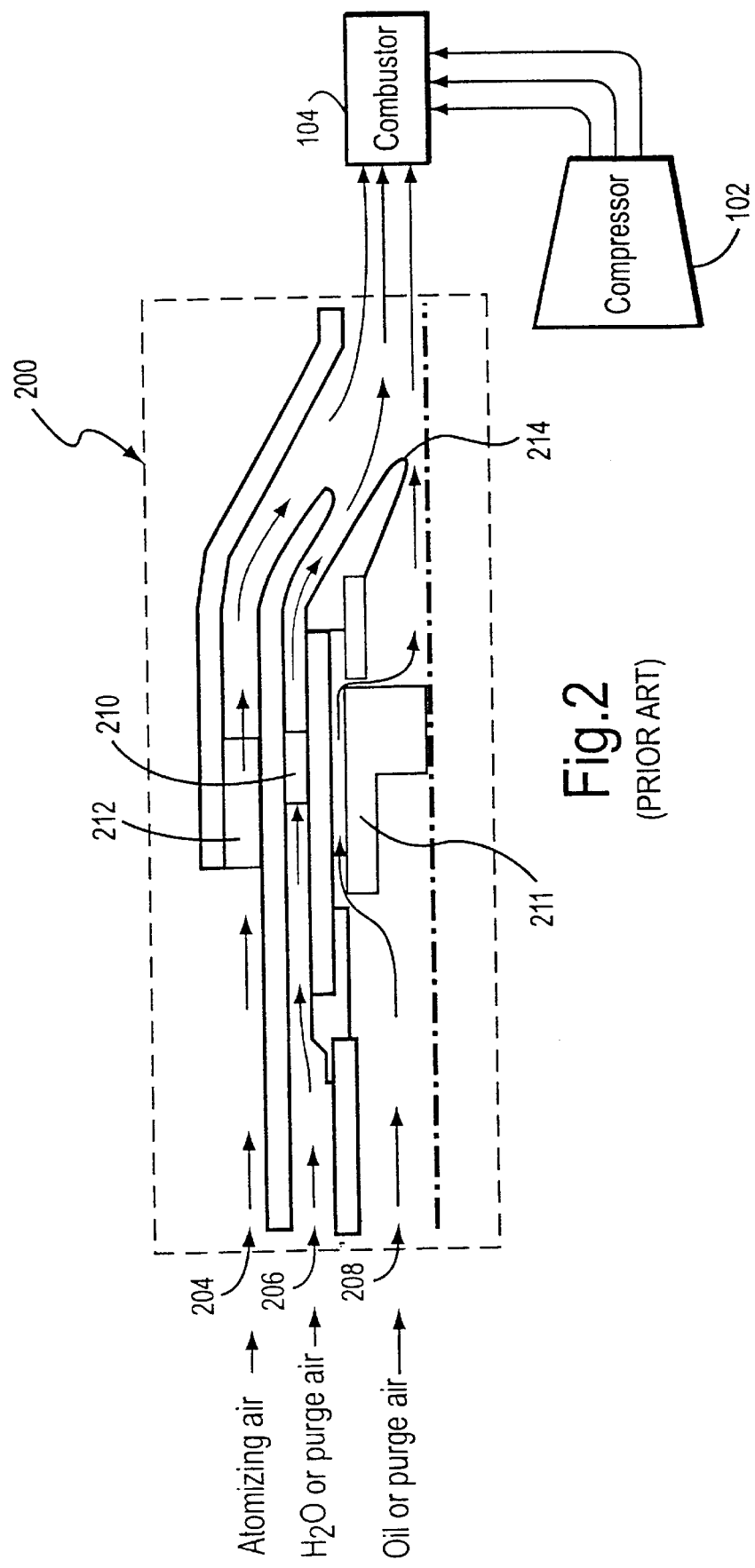
FIG. 2 shows a cross-sectional view of a typical three passageway liquid fuel nozzle cartridge.

FIG. 2 shows a cross-sectional view of a conventional liquid fuel nozzle cartridge 200 having three-passageways 204, 206, 208 for flowing fluids into combustor 104. The first passageway 204 flows atomizing air into combustor 104, the second passageway 206 flows water or purge air into the combustor 104, and the fuel passageway 208 flows liquid fuel or purge air into the combustor 214. Each of the three passageways 204, 206 and 208, respectively, are isolated from one another. Passageways 204, 206 and 208 are provided with respective restriction units ("swirler units") 212, 210 and 211, each swirler unit acting as a primary pressure drop and causing fluid to swirl as it exits the passageways.

FIG. 3 shows a cross-sectional view of a liquid fuel nozzle cartridge 300 having three passageways in accordance with an exemplary embodiment of the present invention. Fuel nozzle cartridge 300 is shown to include a first passageway 204 for flowing atomizing air, a second passageway 206 for flowing purge air or water, and a third passageway 208 ("fuel passageway") for flowing liquid fuel into the combustor 104 (FIG. 1). A crossover-passageway/conduit 302 connects the second passageway 206 and the fuel passageway 208 allowing fluid flow from one to the other. A first end 303 of the conduit 302 is connected to the fuel passageway at a location that is downstream of oil swirler 211, and a second end 304 of the conduit 302 is connected to the second passageway 206 at a location that is upstream of the swirler 210. This arrangement results in fluid flow from the second passageway 206 to the fuel passageway 208 as the second passageway is maintained at a higher pressure relative to the fuel passageway.

When the operation of the gas turbine 100 is switched from gaseous fuel to liquid fuel, or vice-versa, and when both the liquid fuel and liquid fuel purge air are shut off from flowing into combustor 104 (FIG. 1) via fuel passageway 208, purge air flowing through the second passageway 206 continues to flow. A portion of the purge air from the second passageway 206 is diverted into the fuel passageway 208, via conduit 302, to prevent ingestion of hot combustion gases into the nozzle, thereby protecting fuel nozzle tip 214 from hot gas ingestion. Small amounts of purge air may still be flowing through conduit 302 into fuel passageway 208 even after liquid fuel starts flowing through the fuel passageway 208. This, however, should have negligible effect on the operation of the gas turbine 100 so long as the flow volume of purge air is kept small or within predetermined limits.

Although FIG. 3 illustrates a fuel nozzle cartridge having three passageways, one skilled in the art will appreciate that the present invention may be practiced in a fuel nozzle having more than three passageways. The present invention may be implemented in any nozzle cartridge design having the availability of high pressure air supply so that a portion of the high pressure air may be diverted from a selected passageway carrying high pressure air into a fuel passageway to prevent ingestion of hot gases into the nozzle and thereby protecting fuel nozzle tip 214 from hot gas ingestion.

Advantages of air purge include (a) scavenging out any residual fuel left from a prior operation, (b) cooling fuel system components and (c) preventing ingestion of combustion gases through the fuel nozzles.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of protecting a liquid fuel nozzle used in a dual-fuel gas turbine having a compressor, a combustor, and a turbine, the method comprising:
   flowing liquid fuel via a fuel passageway into the combustor;
   flowing purge air into the combustor via a second passageway disposed adjacent to the fuel passageway; and
   interconnecting said fuel passageway and the second passageway via a conduit to enable fluid flow therebetween to protect the nozzle from ingestion of hot combustor gases.

2. A method for operating a dual fuel gas turbine having a combustor, a compressor and a turbine, the method comprising the steps of:
   supplying liquid fuel to the combustor via a nozzle having a plurality of passageways, one of said passageways being a fuel passageway;
   interconnecting said fuel passageway to one of said plurality of passageways via a conduit to enable fluid flow therebetween, said one of the plurality of passageways flowing high pressure air; and
   protecting the nozzle from ingestion of backflow combustion gases by diverting high pressure air from the one of said plurality of passageways into said fuel passageway via said conduit.

3. In a dual-fuel gas turbine having a compressor, a combustor, and a turbine, a method of protecting a liquid fuel nozzle from ingestion of backflow combustion gases comprising the steps of:
   flowing liquid fuel into the combustor via a fuel passageway;
   flowing high pressure air into the combustor via a second passageway; and
   interconnecting said fuel passageway and the second passageway via a conduit to direct flow of high pressure air from said second passageway to said fuel passageway into the combustor.

4. In a gas turbine having a compressor, a combustor and a turbine, a liquid fuel unit for flowing liquid fuel into the combustor via a nozzle assembly, the nozzle assembly comprising:
   passageways for flowing a liquid fuel and high pressure air, respectively, into the combustor;
   a conduit interconnecting said liquid fuel passageway and said high pressure air passageway enabling diversion of at least a portion of the high pressure air flow from said high pressure air passageway into said liquid fuel passageway via said conduit to protect the nozzle from ingestion of hot combustor gases;
   a first swirler arranged in the liquid fuel passageway;
   a first end of said conduit being coupled to said liquid fuel passageway downstream of said first swirler and an opposite second end of said conduit being in communication with the high pressure air passageway, the first end of said conduit being in communication with said liquid fuel passageway downstream of said first swirler.

5. A nozzle assembly according to claim 4, including a second swirler disposed in the high pressure air passageway, the second end of said conduit being in communication with said high pressure air passageway upstream of said second swirler.

6. A liquid fuel nozzle assembly for supplying liquid fuel to a combustor of a gas turbine, the nozzle assembly comprising:
   a fuel passageway for flowing liquid fuel into the combustor;
   an air passageway disposed adjacent to the fuel passageway for flowing purge air into the combustor, the fuel passageway and the purge air passageway being interconnected by a conduit to enable flow therebetween to protect the nozzle from ingestion of hot combustor gases;
   said fuel passageway including a first swirler unit and said purge air passageway including a second swirler unit, said first and second swirler units disposed adjacent an exit of said respective fuel and purge air passageways, said first and second swirler units acting as primary pressure drops in the respective passageways;
   a first end of said conduit being in communication with said fuel passageway at a location downstream of said first swirler unit and an opposite second end of said conduit being in communication with said purge air passageway at a location upstream of said second swirler unit.

7. A nozzle assembly according to claim 6 wherein the purge air passageway is maintained at a higher pressure than the fuel passageway.

8. In a dual-fuel gas turbine having a compressor, a combustor and a turbine, a method of passively protecting a liquid fuel nozzle, comprising the steps of:
   flowing a liquid fuel and purge air into the combustor via respective nozzle passageways;
   coupling said liquid fuel and said purge air passageways to one another via a conduit;
   diverting at least a portion of high pressure air from said purge air passageway into said liquid fuel passageway to protect the nozzle from ingestion of hot combustor gases;
   providing first and second swirler units for said liquid fuel and purge air passageways, respectively, adjacent exit ends thereof;
   coupling a first end of said conduit to said liquid fuel passageway at a location downstream of said first swirler unit in the liquid fuel passageway; and
   coupling an opposite second end of said conduit to said purge air passageway at a location upstream of a second swirler unit in said purge air passageway.

* * * * *